US011055514B1

(12) United States Patent
Cao et al.

(10) Patent No.: US 11,055,514 B1
(45) Date of Patent: Jul. 6, 2021

(54) IMAGE FACE MANIPULATION

(71) Applicant: Snap Inc., Santa Monica, CA (US)

(72) Inventors: Chen Cao, Los Angeles, CA (US);
Sergey Tulyakov, Marina del Rey, CA (US); Zhenglin Geng, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 46 days.

(21) Appl. No.: 16/220,859

(22) Filed: Dec. 14, 2018

(51) Int. Cl.
*G06K 9/00* (2006.01)

(52) U.S. Cl.
CPC ..... *G06K 9/00288* (2013.01); *G06K 9/00228* (2013.01); *G06K 9/00268* (2013.01)

(58) Field of Classification Search
CPC combination set(s) only.
See application file for complete search history.

(56) References Cited

U.S. PATENT DOCUMENTS

| 5,680,481 | A | * | 10/1997 | Prasad | G06K 9/00281 |
| | | | | | 382/190 |
| 5,880,731 | A | | 3/1999 | Liles et al. | |
| 6,023,270 | A | | 2/2000 | Brush, II et al. | |
| 6,223,165 | B1 | | 4/2001 | Lauffer | |
| 6,772,195 | B1 | | 8/2004 | Hatlelid et al. | |
| 6,842,779 | B1 | | 1/2005 | Nishizawa | |
| 6,919,892 | B1 | * | 7/2005 | Cheiky | G06T 13/40 |
| | | | | | 345/473 |
| 7,027,054 | B1 | * | 4/2006 | Cheiky | G06T 13/40 |
| | | | | | 345/473 |
| 7,342,587 | B2 | | 3/2008 | Danzig et al. | |
| 7,468,729 | B1 | | 12/2008 | Levinson | |
| 7,636,755 | B2 | | 12/2009 | Blattner et al. | |
| 7,639,251 | B2 | | 12/2009 | Gu et al. | |
| 7,775,885 | B2 | | 8/2010 | Van Luchene et al. | |
| 7,859,551 | B2 | | 12/2010 | Bulman et al. | |
| 7,885,931 | B2 | | 2/2011 | Seo et al. | |

(Continued)

FOREIGN PATENT DOCUMENTS

| CN | 109863532 A | 6/2019 |
| CN | 110168478 A | 8/2019 |

(Continued)

*Primary Examiner* — Tsung Yin Tsai
(74) *Attorney, Agent, or Firm* — Schwegman Lundberg & Woessner, P.A.

(57) ABSTRACT

Aspects of the present disclosure involve a system comprising a computer-readable storage medium storing a program and a method for synthesizing a realistic image with a new expression of a face in an input image by receiving an input image comprising a face having a first expression; obtaining a target expression for the face; and extracting a texture of the face and a shape of the face. The program and method for generating, based on the extracted texture of the face, a target texture corresponding to the obtained target expression using a first machine learning technique; generating, based on the extracted shape of the face, a target shape corresponding to the obtained target expression using a second machine learning technique; and combining the generated target texture and generated target shape into an output image comprising the face having a second expression corresponding to the obtained target expression.

20 Claims, 12 Drawing Sheets
(5 of 12 Drawing Sheet(s) Filed in Color)

(56) References Cited

U.S. PATENT DOCUMENTS

| | | |
|---|---|---|
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 9,996,981 B1 * | 6/2018 | Tran .................... G06K 9/4671 |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,339,365 B2 * | 7/2019 | Gusarov ............. G06K 9/00248 |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-Amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0007665 A1 * | 1/2010 | Smith ..................... G06T 13/40 |
| | | 345/473 |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn et al. |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0235045 A1 * | 9/2013 | Corazza ................. G06T 13/40 |
| | | 345/473 |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0286752 A1 * | 10/2017 | Gusarov ............. G06K 9/00248 |
| 2017/0300741 A1 * | 10/2017 | Seuss ................. G06K 9/00315 |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |

(56) References Cited

U.S. PATENT DOCUMENTS

| | | | |
|---|---|---|---|
| 2019/0057616 A1 | 2/2019 | Cohen et al. | |
| 2019/0130628 A1* | 5/2019 | Cao | H04R 27/00 |
| 2019/0139240 A1* | 5/2019 | Yan | G06K 9/621 |
| 2019/0188920 A1 | 6/2019 | Mcphee et al. | |
| 2019/0325631 A1* | 10/2019 | Cao | G06T 13/40 |
| 2019/0385019 A1* | 12/2019 | Bazrafkan | G06N 3/088 |
| 2020/0065560 A1* | 2/2020 | Kaneko | G06N 3/08 |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

\* cited by examiner

IMAGE FACE MANIPULATION

TECHNICAL FIELD

The present disclosure relates generally to synthesizing an image of a face and more particularly to performing three-dimensional (3D) face manipulation to synthesize an image of the face.

BACKGROUND

The popularity of electronic messaging continues to grow. Users increasingly use "emojis" (which are ideograms and icons) within electronic messages, such as texts and emails, reflecting a global demand to communicate more visually. Often, users send each other modified images (e.g., pictures with text or objects applied to them) to communicate information. Sometimes these modifications involve changing the expressions of faces present in the images. Changing the expressions of the faces in the images, though, usually results in blurry shapes and appearances of the faces, which prevents realistic face rendering.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
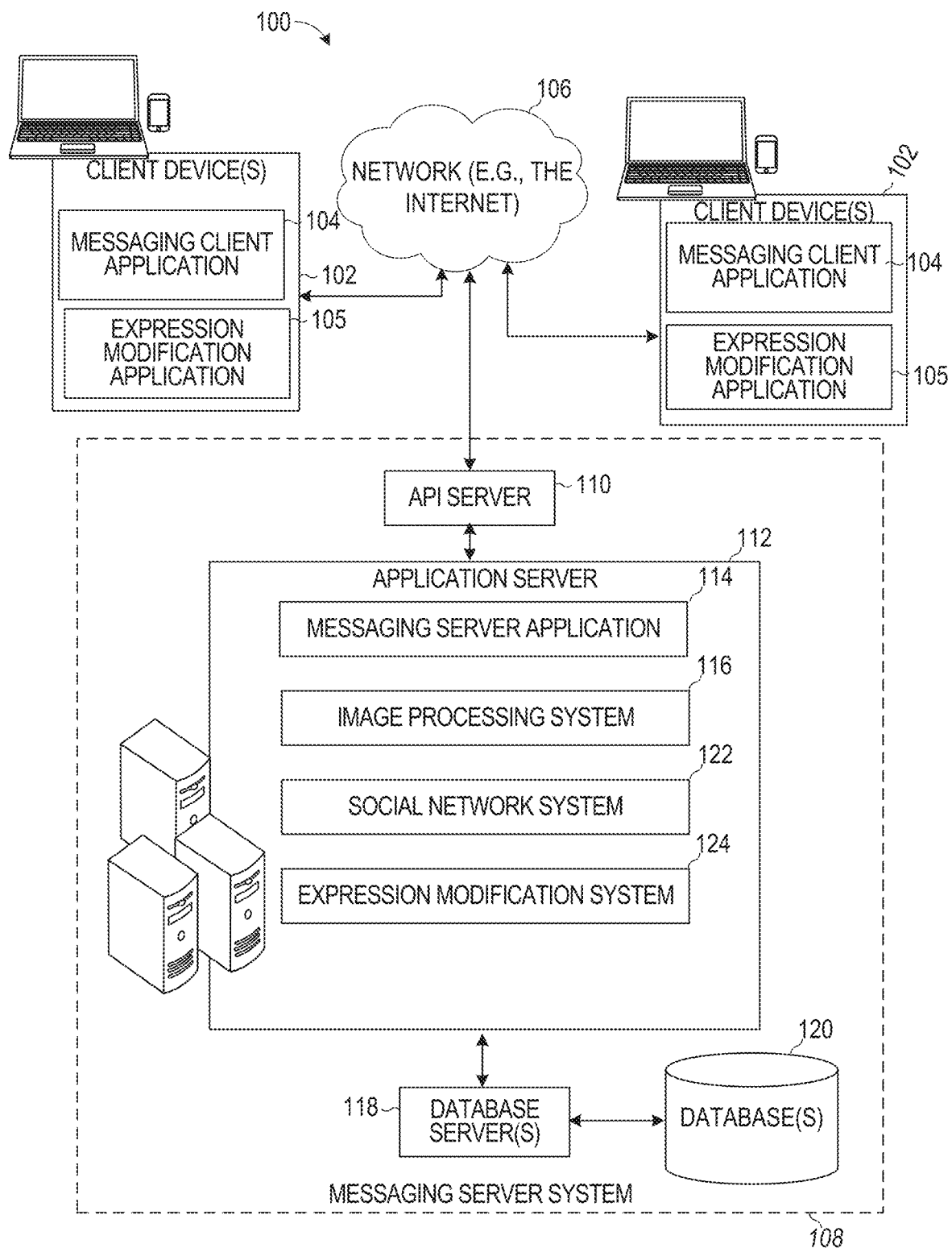
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Users are increasingly seeking new ways to communicate with each other using images including creatively changing the way people look in images. One way users change appearances of people in images includes changing expressions of faces of the people in the images. However, typical methods that enable users to modify facial expressions result in blurry and non-realistic looking faces, which detracts from the overall user experience.

Conventional geometric-based techniques for changing expressions of a face in an image involve fitting an image to a 3D morphable model that is then re-rendered with a different facial expression. These geometric-based techniques fit a 3D face shape to match an input image and change the expression coefficients of the 3D face shape to perform animation by warping the image to a new expression. These geometric-based techniques, though, are incapable of generating facial features that do not exist in the target image, such as teeth, tongue, and other important features. For these and other reasons, such methods fail to achieve realistic appearing images since humans are especially sensitive to perceiving non-realistic looking faces.

The disclosed embodiments improve the efficiency of using the electronic device by separately processing texture and shape of a 3D face model, generated from an input image of a face having one expression, using different machine learning techniques to generate an output image of the face having a different expression. According to the disclosed embodiments, a face image of a person with an arbitrary expression can be received and another arbitrary expression of the person can be synthesized in a new image. This is achieved by first fitting a 3D bilinear face model to the face image and then disentangling the face into a texture and a shape. The texture of the face represents visual properties of respective facial landmarks (e.g., skin color, pattern on the face, teeth features, and so forth), and the shape of the face represents a visual layout of the facial landmarks, such as a physical location of the facial landmarks on the face (e.g., the two-dimensional (2D) positions of facial features including lip contours, eye lid boundaries, face silhouettes, and so forth).

In an embodiment, a conditional generative neural network (cGAN) is used to change the appearance in texture space, and a fully connected neural network in shape space is used to predict accurate shapes. Both of these networks are conditioned on expression coefficients, which enables the networks to generate an unlimited number of facial expressions. The outputs of these networks are combined to generate an output image of the person with a different expression. According to the disclosed embodiments, the output image can include facial features that do not exist in the face depicted in the input image, such as teeth, tongue, and other important features, which provides more realistic looking faces.

Disentangling the shape and texture of the face for separate processing enables the machine learning techniques used to generate shape and textures for a new expression to be trained more efficiently because each machine learning technique can be trained on only a specific set of features. For example, the machine learning technique in the texture space may be easier to train than that in the shape space because even though faces in different images have different head poses and shapes, they tend to look similar in the texture space. Therefore, the machine learning technique in the texture space can largely ignore the variance in poses or expressions and only focus on being trained on features, such as the appearance details like wrinkles, shading, and shadows. In addition, as face shapes can be deconstructed into identity components and expression components, the subject-specific features can be better preserved by only changing the expression components in the shape space. Namely, the machine learning technique in the shape space can be trained more efficiently by focusing only on the expression components. This makes synthesizing the face to resemble the original person's face more realistic and enables the machine learning technique in the shape space to be trained more efficiently and quickly.

According to some embodiments, the system's inputs include a face image and coefficients encoding the desired expression. Such desired expression coefficients can be retrieved based on receiving a selection from a client device (e.g., a user selection) of a target expression for a face in an input image. The 3D shape of the face and the camera projection of the image are fit and used to extract a texture from the image. The texture and the target expression coefficients are input to a first machine learning technique implementing a texture branch to generate a texture that is more likely to be extracted under the target expression. A second machine learning technique implementing a shape branch is used to predict a more accurate shape for improved synthesis quality. With the predicted texture and shape, the predicted face is rendered back onto the input image and can be seamlessly blended into the background of the input image using a third machine learning technique to generate an output image of the face having the target expression.

FIG. 1 is a block diagram showing an example messaging system 100 for exchanging data (e.g., messages and associated content) over a network 106. The messaging system 100 includes multiple client devices 102, each of which hosts a number of applications including a messaging client application 104 and an expression modification application 105. Each messaging client application 104 is communicatively coupled to other instances of the messaging client application 104, the expression modification application 105, and a messaging server system 108 via a network 106 (e.g., the Internet).

Accordingly, each messaging client application 104 and expression modification application 105 is able to communicate and exchange data with another messaging client application 104 and expression modification application 105 and with the messaging server system 108 via the network 106. The data exchanged between messaging client applications 104, expression modification application 105, and between a messaging client application 104 and the messaging server system 108, includes functions (e.g., commands to invoke functions) as well as payload data (e.g., text, audio, video, or other multimedia data).

Expression modification application 105 is an application that includes a set of functions that allow the client device 102 to access expression modification system 124. In some implementations, the expression modification application 105 is a component or a feature that is part of the messaging client application 104. Expression modification application 105 receives a user selection of an image depicting a face. The selection can be received by the user uploading an image to the expression modification application 105 or providing a link to an image to the expression modification application 105. The expression modification application 105 receives a user selection of a target expression. The selection of the target expression indicates an instruction to the expression modification application 105 to generate a new image from the received image in which the person's facial expression is changed from a first expression (e.g., sad) to a second expression (e.g., happy).

The expression modification application 105 applies various trained machine learning techniques to the image depicting the face to change the expression of the face depicted in the image to generate a synthetic image. Once the synthetic image depicting the face with a different expression is generated, the expression modification application 105 allows the user to communicate with another device using the new image. For example, the expression modification application 105 provides the generated image depicting the face with the selected expression to the messaging client application 104. Using the messaging client application 104, a user can communicate the generated image depicting the face with the selected expression to another user device with another instance of the messaging client application 104.

In order for expression modification application 105 to generate the synthetic image (the image depicting the face with a different user selected expression than the face in the input image), the expression modification application 105 obtains one or more trained machine learning techniques from an expression modification system 124 and/or messaging server system 108. The expression modification system 124 receives the input image and a selected expression and performs a face fitting technique to generate a 3D face model of the face depicted in the input image. The expression modification system 124 extracts a face texture and a face shape from the generated 3D face model. The expression modification system 124 applies to the extracted face texture a first machine learning technique (e.g., a cGAN) together with conditions determined from the selected expression. The output of the first machine learning technique includes a predicted texture of the face having the selected expression. In parallel, or sequentially, with generating the predicted texture using the first machine learning technique, the expression modification system 124 applies to the extracted face shape (e.g., identity and source expression coefficients) a second machine learning technique (e.g., a fully connected neural network) together with target expression coefficients determined from the selected expression. The output of the second machine learning technique includes a predicted shape deformation of the face having the selected expression.

The expression modification application combines the outputs of the first and second machine learning techniques to generate a rendered face. The rendered face represents the face in the input image having the selected expression (e.g., a face with a different expression than that depicted in the input image). In some embodiments, the expression modification system 124 applies the rendered face together with the input image to a third machine learning technique (e.g., a fully connected network or cGAN) to generate a new image in which the rendered face is combined with the background of the face in the input image. As part of this process, the expression modification system 124 may first process the rendered face together with the input image to distinguish the background portion from the face portion in the image, and this distinction is provided and used by the third machine learning technique to generate the new image. This new image may be referred to as the synthetic image representing the face from the input image in a different and new expression. These processes are described in more detail below in connection with FIG. 9.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the expression modification system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the expression modification system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends.

The application server 112 is communicatively coupled to a database server 118, which facilitates access to a database 120 in which is stored data associated with messages processed by the messaging server application 114.

Figure 2:
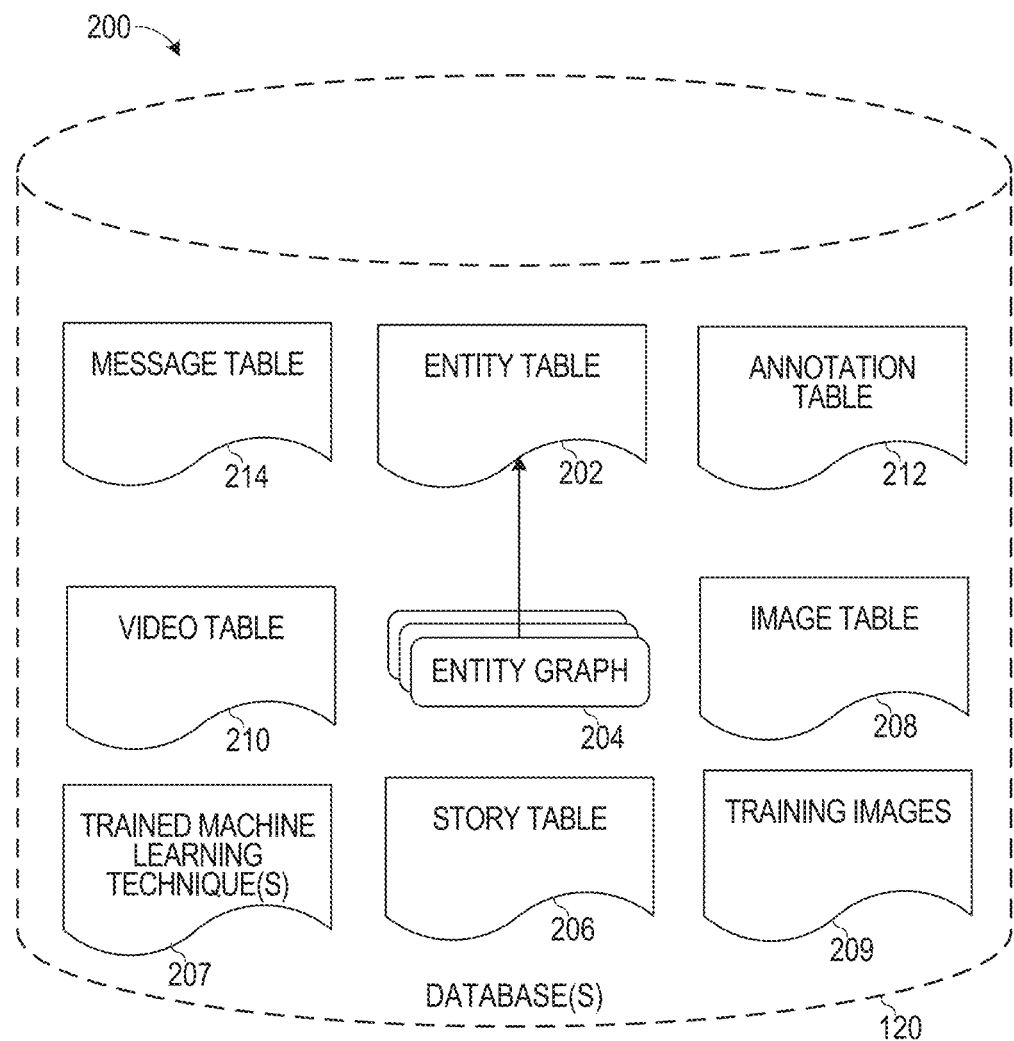
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s). Information from message table 214 may be provided in limited form and on a limited basis to a given web-based gaming application based on functions of the messaging client application 104 invoked by the web-based gaming application.

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Trained machine learning technique(s) 207 stores parameters that have been trained for the machine learning techniques of the expression modification system 124. For example, trained machine learning techniques 207 stores the trained parameters of the machine learning techniques included in the cGAN, 3D face modeling module, fully connected neural network, texture branch, shape branch, and global branch shown and described in connection with FIGS. 4-8.

Training images 209 stores a first plurality of images of depictions of faces of various people, with each face depicting multiple expressions together with depth information for the faces and a second plurality of depictions of faces of various people, with each face depicting multiple expressions without depth information. The first and second plurality of images are used to provide ground truth information to train the machine learning techniques of expression modification system 124.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104, based on his or her location. The end result is a "live story" told from a community perspective.

A further type of content collection is known as a "location story." which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
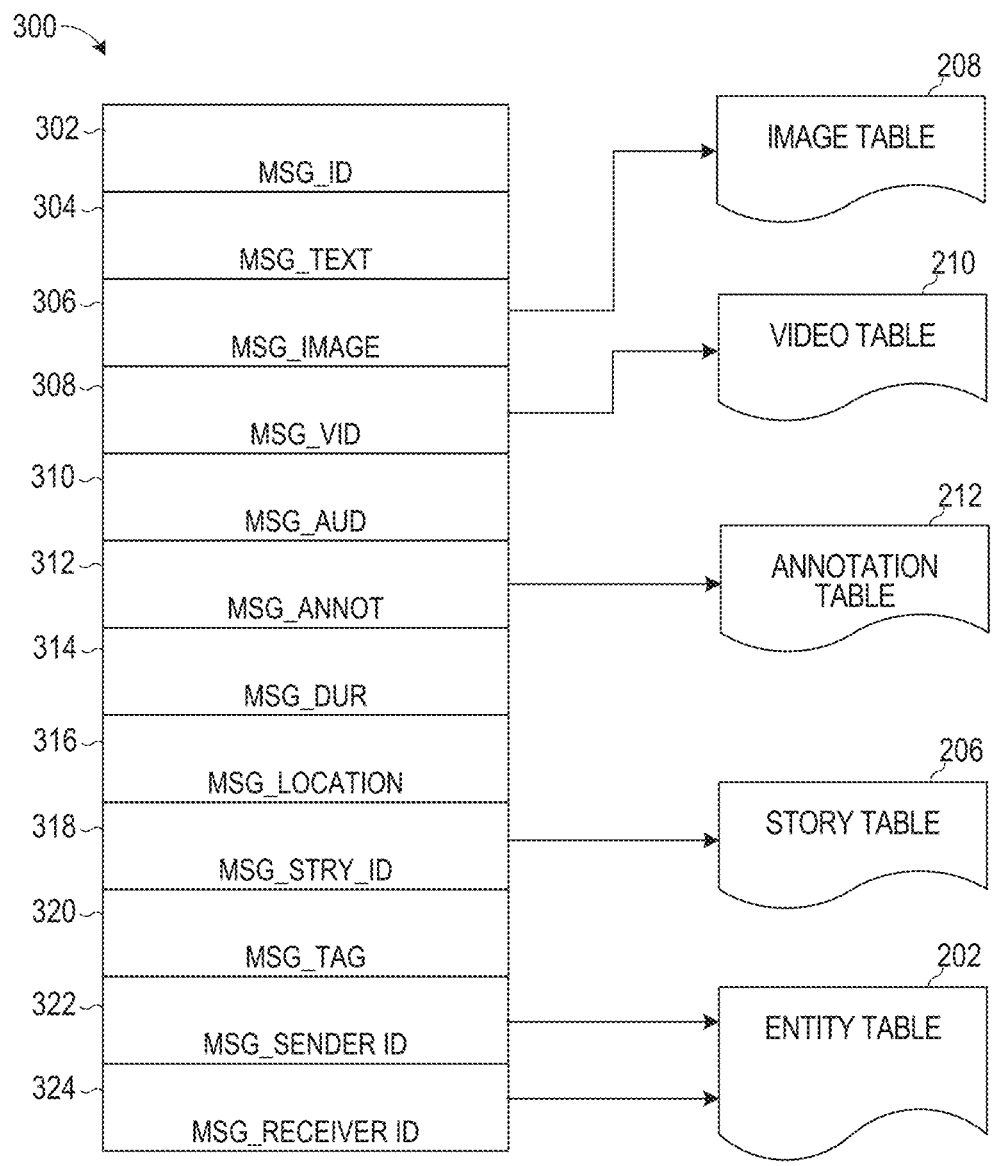
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

- A message identifier 302: a unique identifier that identifies the message 300.
- A message text payload 304: text, to be generated by a user via a UI of the client device 102 and that is included in the message 300.
- A message image payload 306: image data, captured by a camera component of a client device 102 or retrieved from memory of a client device 102, and that is included in the message 300.
- A message video payload 308: video data, captured by a camera component or retrieved from a memory component of the client device 102 and that is included in the message 300.
- A message audio payload 310: audio data, captured by a microphone or retrieved from the memory component of the client device 102, and that is included in the message 300.
- A message annotations 312: annotation data (e.g., filters, stickers (which may include synthetic images), or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g. "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
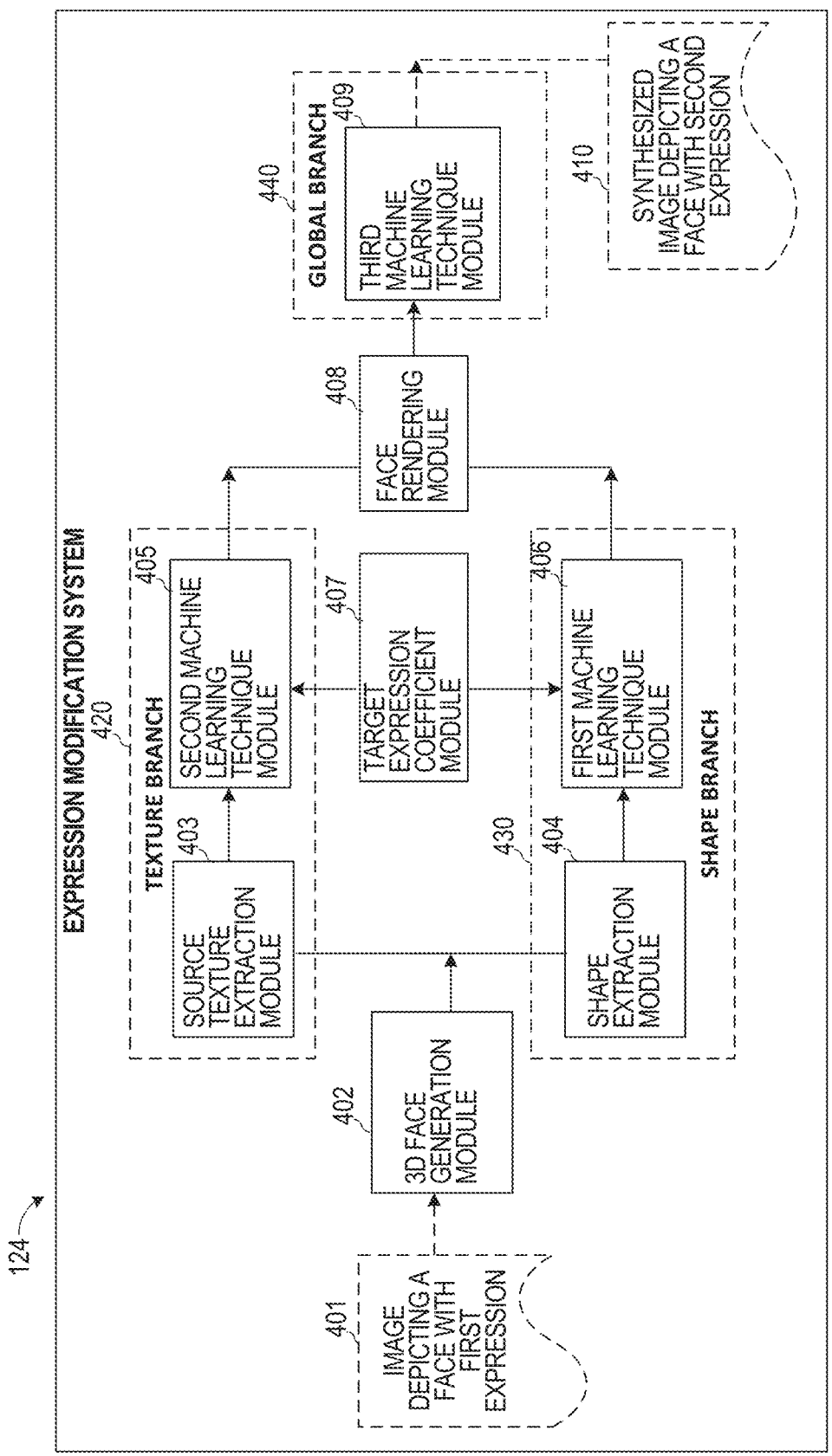
FIGS. 4 and 5 are block diagrams showing examples of an expression modification system, according to example embodiments.

FIG. 4 is a block diagram showing an example expression modification system 124, according to example embodiments. Expression modification system 124 operates on input data 401 (e.g., a 2D image depicting a face with a first expression (e.g., a neutral expression)). The set of input data can be obtained from training images 209 stored in database(s) 200 or from a client device 102 when an expression modification application 105 is being used to modify an expression in an input image, depicting a face, selected by a user. Expression modification system 124 includes a 3D face generation module 402, a texture branch 420, a shape branch 430, a target expression coefficient module 407, a face rendering module 408, and a global branch 440. Each of the texture branch 420, shape branch 430, and global branch 440 implements a different machine learning technique. The parameters of the machine learning techniques of expression modification system 124 are stored as trained machine learning technique(s) 207 to be provided to a client device implementing an expression modification application.

The expression modification system 124 initially is trained using training images that contain ground truth information. After being trained on the training images, the expression modification system 124 can be used on an input image depicting a face with an arbitrary expression to change the arbitrary expression to be any user selected expression. Upon receiving an input image, the expression modification system 124 provides the input image to 3D face generation module 402. Face generation module 402 implements a face fitting process to acquire the 3D face shape and the transformation relative to the camera from an input face image.

Figure 6:
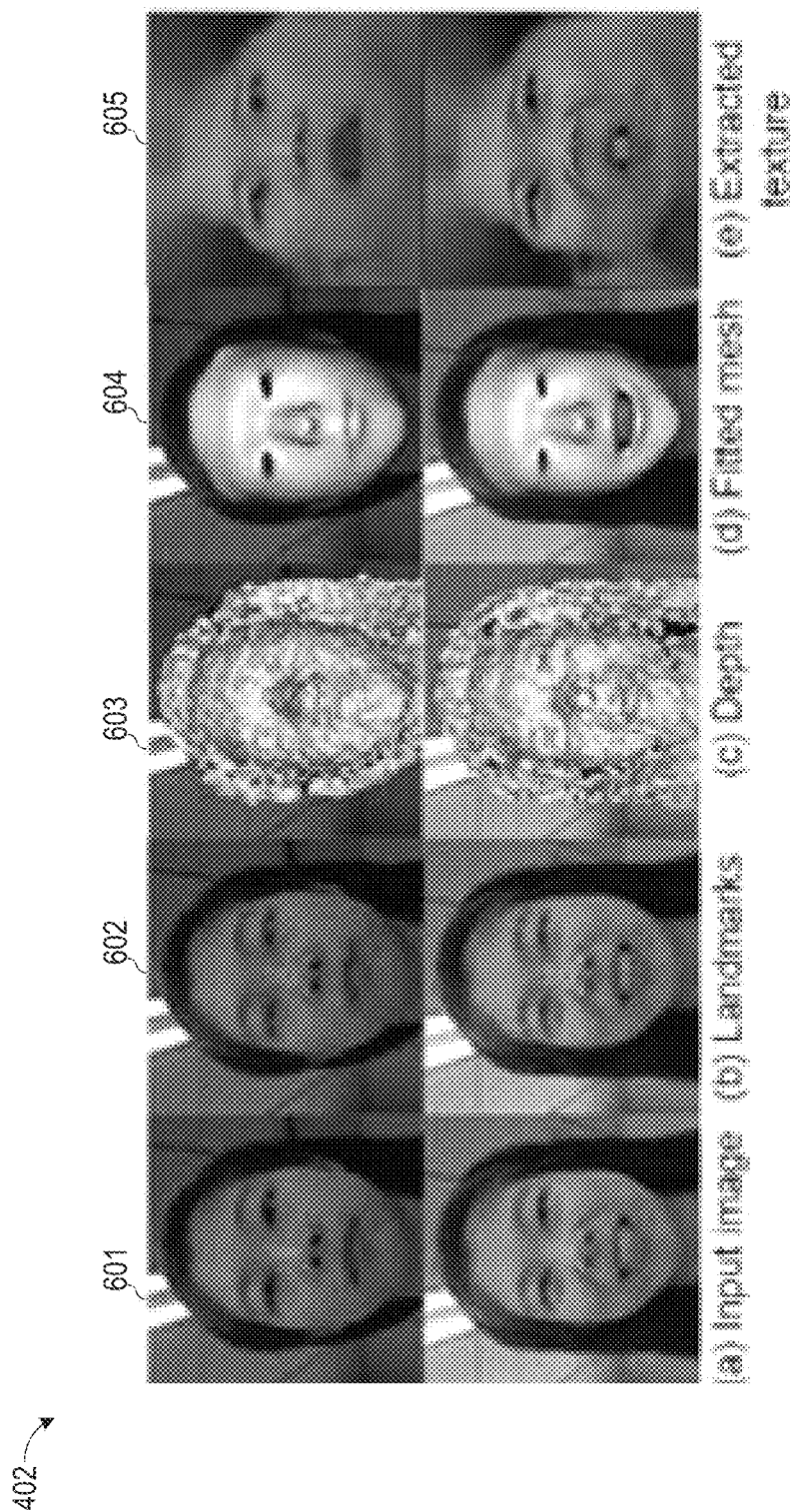
FIG. 6 is an illustrative output of a 3D face generation module, according to example embodiments.

For example, the 3D face generation module 402 first detects 96 landmarks from the input face images. In particular, the 3D face generation module 402 detects 96 landmarks from the input images 601 (FIG. 6). The landmarks are 2D positions of important facial features, such as lip contours, eyelid boundaries, face silhouettes, and so forth. These features are represented in image 602. A bilinear model is then used to represent the face shape. An example of a bilinear model is shown and described in Brand U.S. Pat. App. Pub. 2006/0001673, filed Jun. 30, 2004, which is incorporated by reference in its entirety.

In an embodiment, the bilinear face model can be implemented by obtaining the facial geometry of 150 persons, each containing a same set of 47 facial expressions (one neutral and 46 others). All of these face meshes share the same topology and thus have the same number of vertices. The data set is assembled into a rank-3 (3-mode) data tensor T (11K vertices×150 identities×47 expressions). The data tensor is arranged so that each face slice with a varying second factor and a fixed third factor contains face vectors with the same expression (for different identities), and each slice with a varying third factor and fixed second factor contains the same identity (with different expressions).

An N-mode singular value decomposition (SVD) is applied to decompose the tensor without factoring along the vertex mode (mode-1). The N-mode SVD process is represented as Equation 1:

$$\lfloor T \times_2 U_{id}^T \times_3 U_{exp}^T = C, \quad (1)$$

where T is the data tensor and C is called the core tensor. $U_{id}$ and $U_{exp}$ are orthonormal transform matrices, which contain the left singular vectors of the second mode (identity) space and second mode (expression) space, respectively. Third-mode SVD helps "rotate" the data tensor and sort the variance of C in decreasing order for each mode. This enables truncating the insignificant components of C to obtain a reduced model of the data set to approximate the original data tensor as Equation 2:

$$T \cong C_r \times_2 \breve{U}_{id} \times_3 \breve{U}_{exp}, \quad (2)$$

where $C_r$ is the reduced core tensor produced by keeping the top-left corner of the original core tensor. $\breve{U}_{id}$ and $\breve{U}_{exp}$ are the truncated matrices from $U_{id}^T$ and $U_{exp}^T$ by removing the trailing columns. $C_r$ represents the bilinear face model in which any facial expression of any person can be approximated by the tensor contraction in Equation 3:

$$V = C_r \times_2 w_{id}^T \times_3 w_{exp}^T, \qquad (3)$$

where $w_{id}$ and $w_{exp}$ are the column vectors of identity weights and expression weights, respectively.

According to the disclosed embodiments, a face shape S determined by the 3D face generation module 402 can be calculated, according to Equations 1-3, as a tensor contraction of the weight tensor $C_r \in \mathbb{R}^{3 \times N_a \times N_e}$, identity coefficients $a \in \mathbb{R}^{N_a}$, and expression coefficients $e \in \mathbb{R}^{N_e}$. The 3D face shape S, shown in image 604, can be reconstructed as Equation 4:

$$S = C_r \times_2 a \times_3 e, \qquad (4)$$

where $x_i$ is the tensor contraction operation along the ith mode of the bilinear face model. The 3D face generation module 402 jointly estimates the camera projection transformation M: $\mathbb{R} \rightarrow \mathbb{R}^2$, as well as identity and expression coefficients, to minimize the L2 distance between the 2D facial landmarks and the corresponding projected vertices from the 3D shape. For multiple images of the same person, the identity coefficients can be kept consistent among the images. After obtaining an initial estimation of the shape parameters, unified identity coefficients a (in Equation 4) are computed by fixing the M and the e values of each image.

In an embodiment, to decouple texture and shape, the shapes are fitted accurately to extract accurate textures. For the input image with a depth map 603, the 3D face generation module 402 minimizes the 2D landmark error by finding the closest 3D point in the depth map 603 for each vertex. Then, the 3D face generation module 402 estimates the shape parameters by minimizing the L2 distance between the shape vertices and the 3D depth points. This shape is refined using a Laplacian-based mesh deformation technique which further deforms the face shape more closely to the depth map. For an input image without a depth map, after optimizing for the identity and expression coefficients, the shape is deformed to further reduce landmark matching errors. For each 3D shape vertex, the 2D uv-coordinate is defined which is consistent across all 3D shapes. With these uv-coordinates and the face fitting results, the pixel values from the image space can be projected to texture space as shown in image 605. In an embodiment, the source texture extraction module 403 is configured to obtain the texture of a source image based on the output of 3D face generation module 402. In an embodiment, the shape extraction module 404 is configured to obtain the source expression and identity coefficients of a source image based on the output of 3D face generation module 402.

The second machine learning technique module 405 of the texture branch 420 implements a cGAN. GAN can be extended to a conditional model if both the generator and discriminator are conditioned on some extra information y. y could be any kind of auxiliary information such as class labels or data from other modalities. Conditioning can be performed by feeding y into both the discriminator and generator as an additional input layer. In the generator, the prior input noise $p_z(Z)$ and y are combined in joint hidden representation, and the adversarial training framework allows for considerable flexibility in how this hidden representation is composed. In the discriminator, x and y are presented as inputs to a discriminative function. The objective function of a two-player minimax game can be represented as Equation 5:

$$\min_G \max_D V(D, G) = \qquad (5)$$
$$E_{x \sim p_{data}}(x)[\log D(x \mid y)] + E_{z \sim p_z}(z)[\log(1 - D(G(z \mid y)))].$$

The second machine learning technique module 405 of the texture branch 420 is trained to learn a function $G(T^{src}, e^{src}, e^{tgt})$, which transfers a texture $T^{src}$ extracted from a source image (e.g., the texture provided by source texture extraction module 403) with the expression $e^{src}$ to texture $T^{tgt}$, which is more likely to be extracted from faces of the target expression $e^{tgt}$. The cGAN implemented by the second machine learning technique module 405 is trained to learn the function $G(T^{src}, e^{src}, e^{tgt})$.

In a typical GAN setting, the generator G is usually modeled as a convolutional neural network (CNN). To implement the cGAN, the generator takes both the texture input image T and the expression coefficient vectors e as input. The expression coefficient vectors e are generated and provided by the target expression coefficient module 407. Specifically, depending on which target expression a user desires or which target expression is present in the ground truth image corresponding to the input training image, the target expression coefficient module 407 selects the corresponding expression coefficient vectors. In an embodiment, the target expression coefficient module 407 stores a look-up table of various expressions and their corresponding coefficient vectors. The target expression coefficient module 407 receives an input that identifies a particular target expression (e.g., a target expression selected by a user to transform an input image or the target expression of the ground truth image corresponding to the input training image) and retrieves the corresponding expression coefficient vectors using the input the target expression coefficient module 407. These coefficient vectors are provided from the target expression coefficient module 407 to first and second machine learning technique modules 406 and 405.

Figure 7:
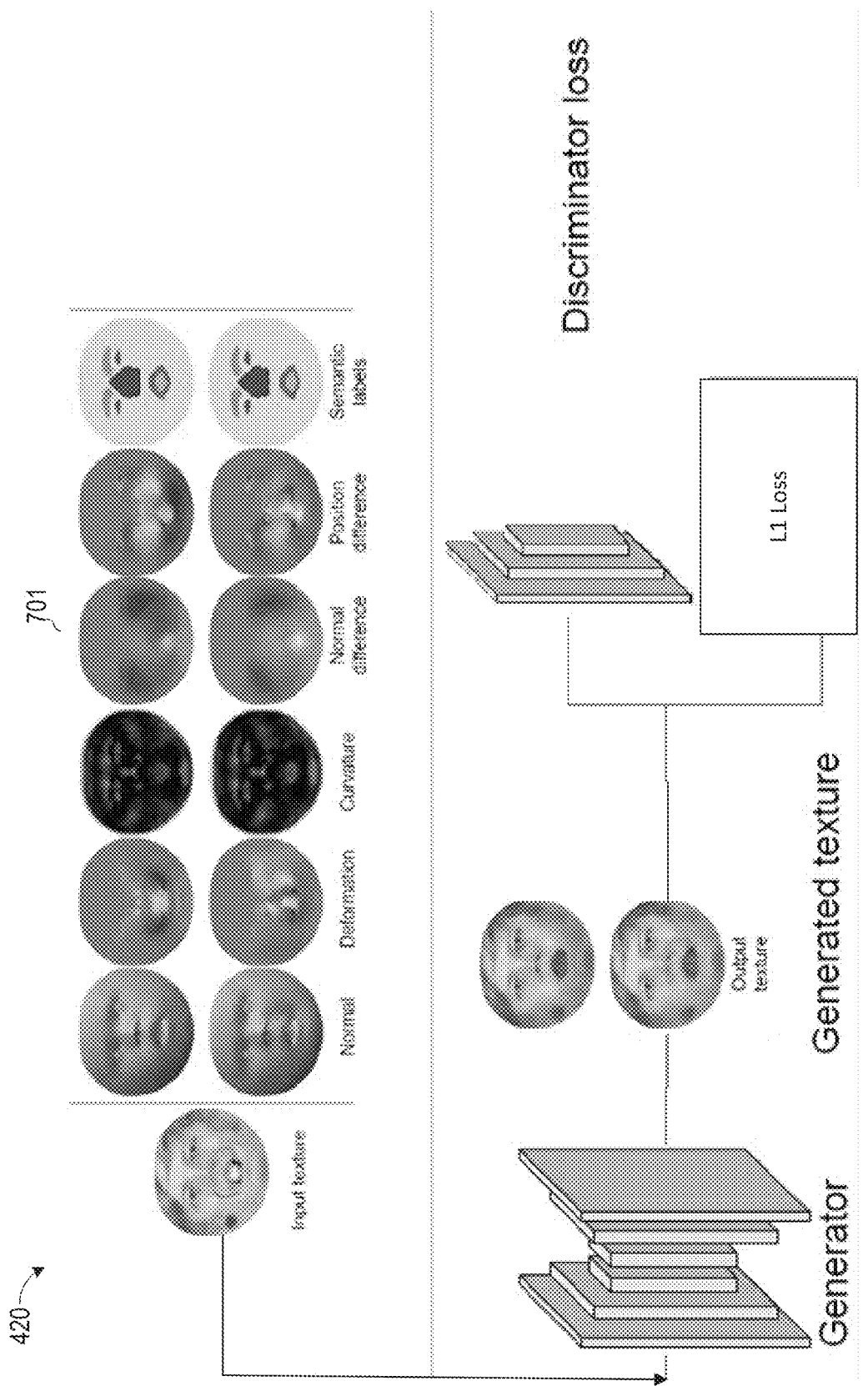
FIG. 7 is a block diagram showing an example of a texture branch of the expression modification system, according to example embodiments.

The second machine learning technique module 405 combines the texture image T format with the expression coefficient vectors e by concatenating each element of e as a separate feature plane to the image T. To better facilitate training, some important geometry information of e can be encoded into the 2D texture space. These geometric textures can be used as conditions to be concatenated with the input texture T. FIG. 7 shows examples of geometric textures 701 that can be used as conditions to be concatenated with an input texture. As shown in geometric textures 701, normal determines the orientation of the local surface and is usually considered important in shading. Deformation is determined by the ratio of the one-ring area near each vertex in the target and neutral expressions. A small deformation value may signify compression, which is usually associated with wrinkles. Curvature marks bumped regions from flat regions, which usually have quite different appearances. Position and normal differences encode similarities between source and target expressions around each vertex, which indicates the likelihood of the output pixel resembling the input pixel at the same location. To address translational equivariance of the convolutional filters of the generator in the cGAN, semantic labels are used to indicate different facial components, which have very different appearances and thus should be treated differently. These labels include eyes, eyebrows, nose, lips and inner mouth, and others.

As discussed above, in a GAN setting, a generator and a discriminator play a min-max game alternatively, which leads the generator to learn to synthesize images that have similar distributions as the training images at the end. The min-max game objective of the second machine learning technique module 405 is composed of three terms: the realism term $L_{real}$, the pair-wise term $L_{pair}$ and the identity term $L_{iden}$. These three loss terms are calculated from three discriminators $D_{real}$, $D_{pair}$ and $D_{iden}$, respectively. Let $T_{i,p}^{real}$, $T_{i,p}^{fake}$ be the real and fake textures of $a_i$ under the expression $e_p$. The discriminator of the second machine learning technique module 405 is designed to stress different aspects in the objective based on Equations 6 and 7:

$$\bar{L}_2(x)=\|x-1\|^2, \tag{6}$$

$$L_2(x)=\|x\|^2. \tag{7}$$

$D_{real}$ is the standard discriminator to discriminate between real textures $T_{i,p}^{real}$ and synthesized fake textures $T_{i,p}^{fake}$. $D_{pair}$ is used to ensure pair consistency between the texture and the expression coefficients. The discriminator $D_{pair}$ is trained to learn to differentiate matched pairs of real texture and expressions $(T_{i,p}^{real}, e_p)$ from matched pairs of fake texture and expressions $(T_{i,p}^{fake}, e_p)$ and mismatched pairs of real texture and expressions $(T_{i,p}^{real}, e_r)$ where $e_r$ is a random expression. $D_{iden}$ is used to help preserve identities through transformations. $D_{iden}$ is used to differential real textures with the same identity $(T_{i,p}^{real}, T_{i,q}^{real})$ from real and fake textures with the same identity $(T_{i,p}^{real}, T_{i,q}^{fake})$ and real textures with different identities $(T_{i,p}^{real}, T_{j,q}^{real})$ where p,q index random expressions and i,j index different identities.

$L_{real}$ is used to differentiate real images and fake generated images according to Equation 8:

$$L_{real}=\bar{L}_2(D_{real}(T_{i,p}^{real}))+L_2(D_{real}(T_{i,p}^{fake})). \tag{8}$$

$L_{pair}$ is used to differentiate matched pairs of real texture and expressions $(T_{i,p}^{real}, e_p)$ from matched pairs of fake texture and expressions $(T_{i,p}^{fake}, e_p)$ and mismatched pairs of real texture and expressions $(T_{i,p}^{real}, e_r)$, where $e_r$ is a random expression according to Equation 9:

$$L_{pair}=2\bar{L}_2(D_{pair}(T_{i,p}^{real}, e_p))+L_2(D_{pair}(T_{i,p}^{fake}, e_p))+L_2(T_{i,p}^{real}, e_r)). \tag{9}$$

$L_{iden}$ is used to differentiate real textures with the same identity $(T_{i,p}^{real}, T_{i,q}^{real})$, from real and fake textures with the same identity $(T_{i,p}^{real}, T_{i,q}^{fake})$, and real textures with different identities $(T_{i,p}^{real}, T_{j,q}^{real})$, where p,q index random expressions and i,j index different identities according to Equation 10:

$$L_{iden}=2\bar{L}_2(D_{iden}(T_{i,p}^{real}, T_{i,q}^{real}))+ \\ L_2(D_{iden}(T_{i,p}^{real}, T_{i,q}^{fake}))+L_2(T_{i,p}^{real}, T_{j,q}^{real}). \tag{10}$$

The second machine learning technique module 405 performs linear, non-linear, or log-based regression techniques to compute the parameters of the discriminator and the generator. The aggregate GAN objective is defined according to Equation 11:

$$L_{GAN}=L_{real}+L_{pair}+L_{iden}, \tag{11}$$

The objective for the discriminators is defined according to Equation 12:

$$\max_{D_{real},D_{pair},D_{iden}} \mathcal{L}_{GAN}, \tag{12}$$

The generator G tries to minimize $L_{GAN}$ supervised by $L_1$ loss and perceptual loss $L_{perc}$. The generator objective is defined according to Equation 13:

$$\min_G \mathcal{L}_{GAN} + \lambda_{L_1} \mathcal{L}_1 + \lambda_{perc} \mathcal{L}_{perc}. \tag{13}$$

The first machine learning technique module 406 of the shape branch 430 implements a type of CNN that is fully connected. Generally, CNN is a type of feed-forward artificial neural network where the individual neurons are tiled in such a way that they respond to overlapping regions in the visual field. CNNs consist of multiple layers of small neuron collections, which look at small portions of the input image, called receptive fields. The results of these collections are then tiled so that they overlap to obtain a better representation of the original image: this is repeated for every such layer. Convolutional networks may include local or global pooling layers, which combine the outputs of neuron clusters. They also consist of various combinations of convolutional layers and fully connected layers, with pointwise nonlinearity applied at the end of or after each layer. The idea of using a convolution operation on small regions has been introduced To avoid the situation that there exist billions of parameters if all layers are fully connected. One major advantage of convolutional networks is the use of shared weight in convolutional layers, which means that the same filter (weights bank) is used for each pixel in the layer; this both reduces required memory size and improves performance.

SVMs are supervised learning models with associated learning algorithms that are configured to recognize patterns. Given a set of training examples, with each marked as belonging to one of two categories, an SVM training algorithm builds a model that assigns new examples into one category or the other, making it a non-probabilistic binary linear classifier. An SVM model is a representation of the examples as points in space, mapped so that the examples of the separate categories are divided by a clear gap that is as wide as possible. New examples are then mapped into that same space and predicted to belong to a category based on which side of the gap they fall on.

The 3D face shape S is usually a non-linear function of the expression coefficients due to the complex interaction of muscles, flesh, and bones. The first machine learning technique module 406 deforms the face shape S to obtain an accurate shape, either through depth or landmarks. To fully capture these details of face shapes, first machine learning technique module 406 defines a shape function as a linear interpolation using Equation 4 and a non-linear part $D(a, e^{src}, e^{tgt})$, which is an additional deformation field on the face shape. For example, first machine learning technique module 406 uses Equation 14 to deform the face shape:

$$S=C_r \times_2 a \times_3 e + D(a, e^{src}, e^{tgt}). \tag{14}$$

Figure 8:
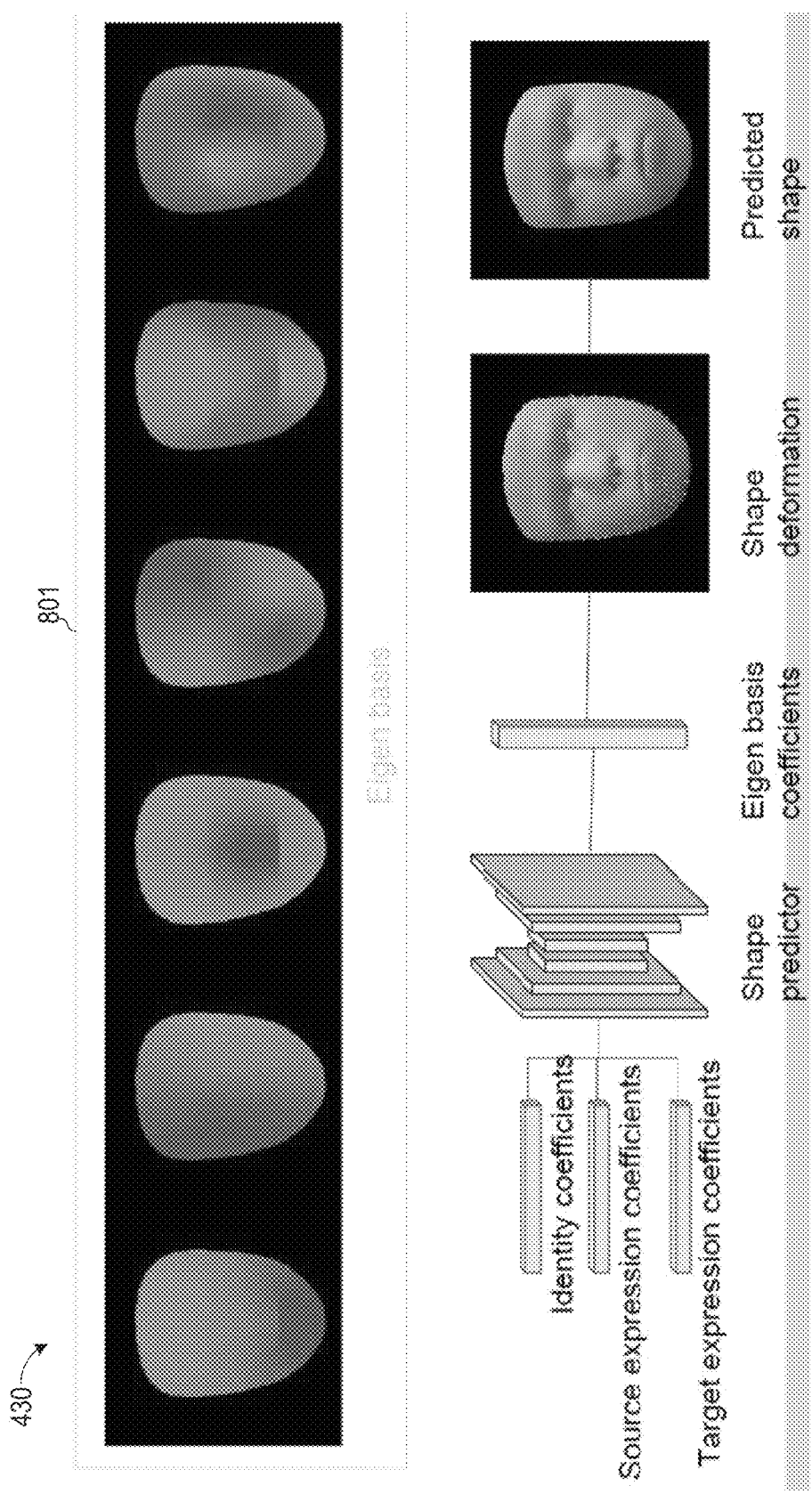
FIG. 8 is a block diagram showing an example of a shape branch of the expression modification system, according to example embodiments.

First machine learning technique module 406 trains a neural network to only learn the deformation D to reduce variance. The output of $D(a, e^{src}, e^{tgt})$ is the displacement vectors for all the vertices on the shape. To reduce dimensionality of these vectors, the vertex displacements can be modeled using a spectral representation. Eigenvectors are computed of the k smallest non-zero eigenvalues of the graph Laplacian matrix of a generic 3D face shape, which are then used as a basis of vertex displacements. A fully connected network with two hidden layers is used to predict the basis coefficients. FIG. 8 shows the first five eigenvectors 801 that are computed by first machine learning technique module 406. As shown in FIG. 8, the first machine learning technique module 406 obtains the identity coefficients and source expression coefficients of the input image from shape extraction module 404 and target expression coefficients from target expression coefficient module 407. The first machine learning technique module 406 applies a fully connected network to these coefficients to generate eigen basis coefficient vectors to provide the shape deformation and a predicted shape.

The outputs of the texture branch 420 and the shape branch 430 are provided to a face rendering module 408. Face rendering module 408 performs bilinear interpolation to combine the predicted texture provided by the texture branch 420 with the predicted shape provided by the shape branch 430. The face rendering module 408 provides the rendered face to the global branch 440. Global branch 440 implements a third machine learning technique module 409 that includes a fully connected neural network, a CNN, or a GAN.

The third machine learning technique module 409 takes the predicted texture $\hat{T}$ and predicted shape $\hat{S}$ and uses them to render the predicted face on the input image. The goal of the third machine learning technique module 409 is to blend the rendered face provided by the face rendering module 408 into the background image of the input image. The global branch 440 first makes an artificial margin between the rendered face provided by face rendering module 408 and the background image of the input image to allow the third machine learning technique module 409 to hallucinate inside. The third machine learning technique module 409 that takes the input image, the rendered face from the face rendering module 408, and the region outside of the margin as input. The third machine learning technique module 409 then learns to blend the face and background together. Occasionally, artifacts are produced near the boundary and in such circumstances, the global branch 408 performs image blending with the input image after the third machine learning technique module 409 combines the rendered face with the input image. The output of the global branch 440 is a synthesized image depicting a face with a second expression 410.

In some embodiments, the machine learning techniques of the texture and shape branches 420 and 430 are trained first. Then, the weights and parameters of the machine learning techniques of the texture and shape branches 420 and 430 are fixed while the machine learning technique in the global branch 440 is trained.

In some embodiments, the expression modification system 124 is initially trained using a set of training images and corresponding training meshes. Specifically, the 3D face generation module 402 generates a set of training meshes generated from respective training images, with each comprising a background and a face having a given expression. The machine learning technique module in the texture branch 420 is trained using a plurality of different target expressions, the first machine learning technique to establish a relationship between texture features of each of the set of training meshes and a selected one of the different target expressions. The machine learning technique module in the shape branch 430 is trained using a plurality of different target expressions to establish a relationship between shape features of each of the set of training meshes and the selected one of the different target expressions. The face rendering module 408 generates a plurality of rendered faces having the different target expressions for each of the training images using outputs of the first and second machine learning techniques. After the texture branch and shape branch machine learning techniques are trained, for each different target expression, the machine learning technique in the global branch 440 is trained to establish a relationship between the background of each training image and a corresponding one of the plurality of rendered faces.

Figure 5:
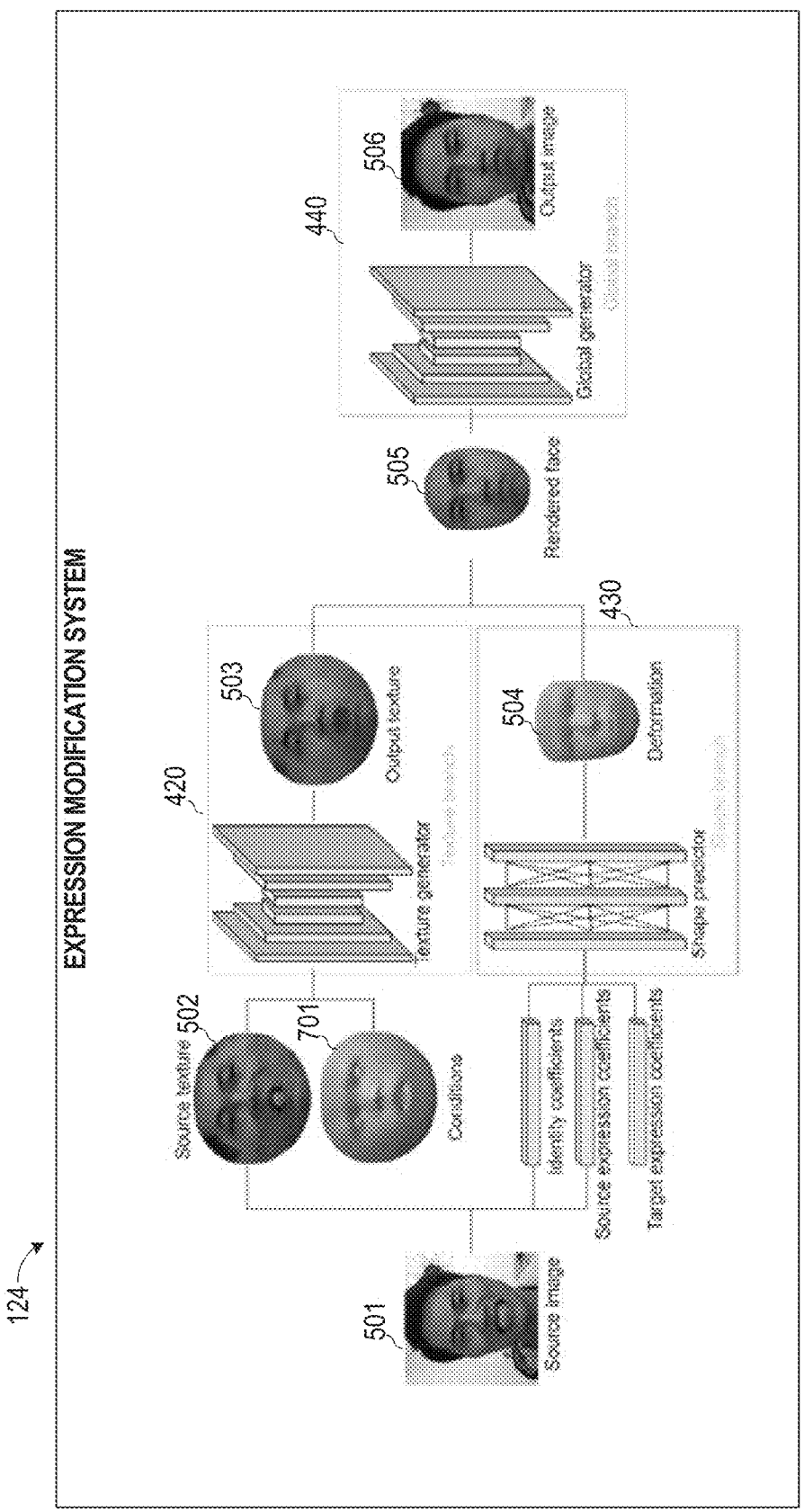

FIG. 5 illustrates example outputs of the expression modification system 124 as applied to a source image at every branch to provide an example output image. For example, given an input image 501 as a source image, the 3D face generation module 402 outputs a 3D face model which source texture extraction module 403 uses to retrieve the source texture 502 of the input image 501. The texture branch 420 receives the source texture 502 and geometric textures 701 and generates an output texture corresponding to the source texture representing a different expression. The shape branch 430 receives the identity and source expression coefficients and target expression coefficients and generates an output shape deformation 504 corresponding to the source shape representing a different expression. The face rendering module 408 combines the output texture and the output shape deformation from the texture and shape branches and generates a rendered face 505. The rendered face 505 is provided to the global branch 440 along with the source image 501, which combines the rendered face 505 with the source image 501 to generate a synthesized output image 506 in which the rendered face 505 is combined with the background of the source image 501.

Figure 9:
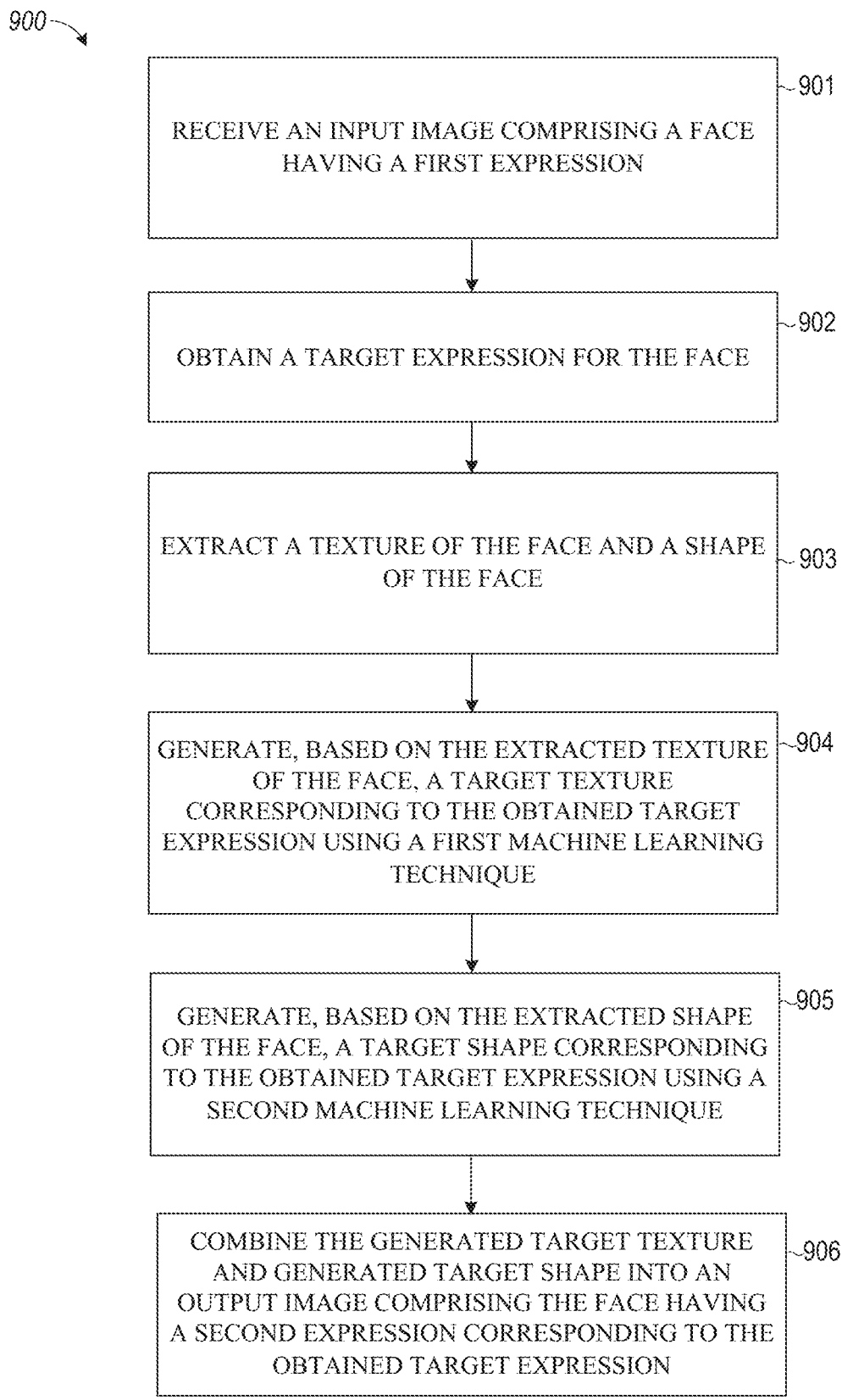
FIG. 9 is a flowchart illustrating example operations of the expression modification system, according to example embodiments.

FIG. 9 is a flowchart illustrating example operations of the expression modification system 124 in performing a process 900, according to example embodiments. The process 900 may be embodied in computer-readable instructions for execution by one or more processors such that the operations of the process 900 may be performed in part or in whole by the functional components of the messaging server system 108 and/or expression modification application 105; accordingly, the process 900 is described below by way of example with reference thereto. However, in other embodiments, at least some of the operations of the process 900 may be deployed on various other hardware configurations. The process 900 is therefore not intended to be limited to the messaging server system 108 and can be implemented in whole, or in part, by any other component.

At operation 901, the expression modification system 124 receives an input image comprising a face having a first expression. For example, the expression modification system 124 receives from an expression modification application 105 a given 2D image depicting a face with a given expression (e.g., a person with a neutral expression).

At operation 902, the expression modification system 124 obtains a target expression for the face. For example, expression modification system 124 receives a target expression indicating a modified expression for the depicted expression on the face in the given image from an expression modification application 105. Specifically, a user can specify a selection to modify a neutral expression on a face in a given image to a happy or sad expression.

At operation 903, the expression modification system 124 extracts a texture of the face and a shape of the face. For example, the 3D face generation module 402 processes the given image to generate a 3D model of the face (e.g., a 3D mesh). A source texture extraction module 403 processes the 3D model to obtain the source textures from the 3D model.

At operation 904, the expression modification system 124 generates, based on the extracted texture of the face, a target texture corresponding to the obtained target expression using a first machine learning technique. For example, the machine learning technique implemented by the texture branch 420 obtains a target expression coefficient from the target expression coefficient module 407 based on the target expression received from the expression modification application 105. The texture branch 420 generates a target or predicted texture based on the source texture and the target coefficients.

At operation 905, the expression modification system 124 generates, based on the extracted shape of the face, a target shape corresponding to the obtained target expression using a second machine learning technique. For example, the machine learning technique implemented by the shape branch 430 obtains target expression coefficients from the target expression coefficient module 407 based on the target expression received from the expression modification application 105. The shape branch 430 generates a target or predicted shape based on the source shape (e.g., source identity and expression coefficients) and the target coefficients.

At operation 906, the expression modification system 124 combines the generated target texture and the generated target shape into an output image comprising the face having the second expression corresponding to the obtained target expression. For example, the face rendering module 408 combines the output texture and shape from the texture and shape branches 420 and 430 into a rendered face. This rendered face is provided to the global branch 440 along with the given image to render the rendered face depicting a selected expression (different from the expression of the face depicted in the input image) onto the background of the given input image. This output image is provided back to the expression modification application 105 to be used by the messaging client application 104. For example, a user can send the output image depicting a face synthesized with a different expression from a face depicted on an input image to another user with an instant message.

Figure 10:
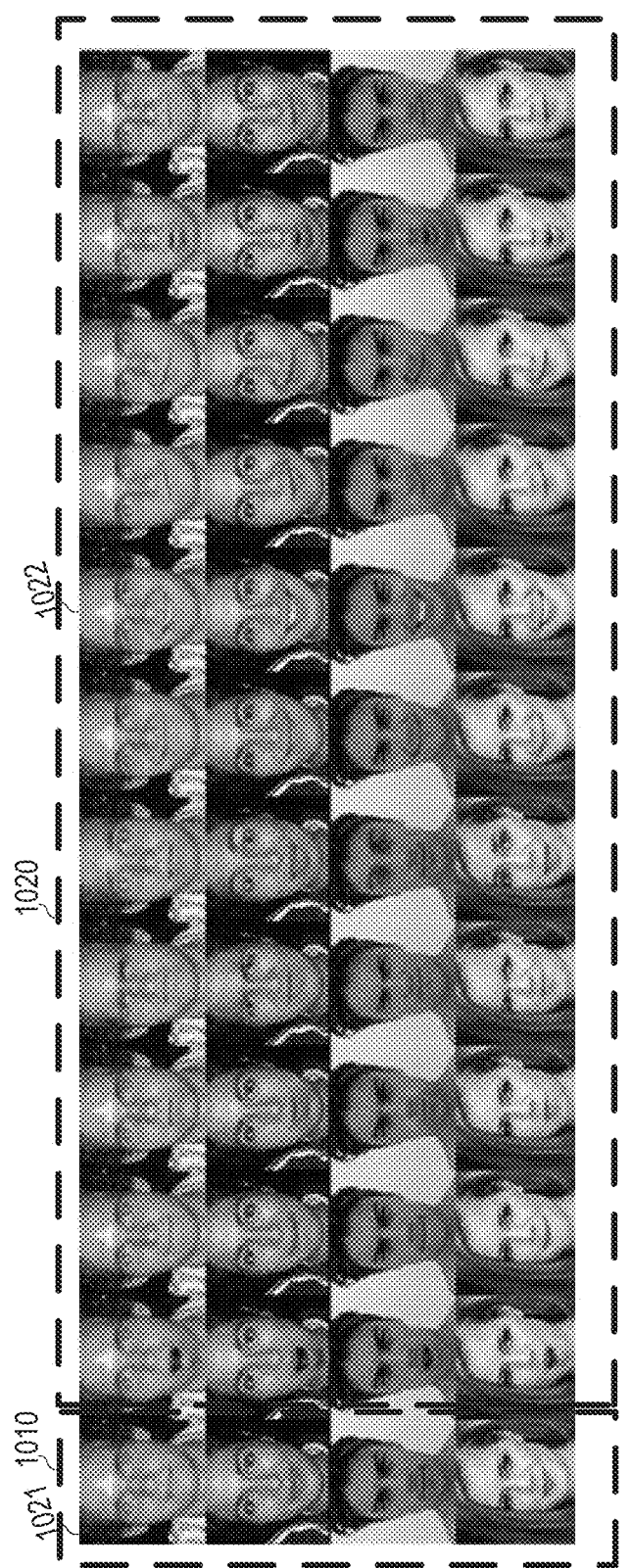
FIG. 10 shows illustrative inputs and outputs of the expression modification system, according to example embodiments.

FIG. 10 provides example outputs of the expression modification system 124 as applied to an input image (each row represents in column 1010 represents a face of a different person with a respective expression) to generate one or more output images (each column 1020 represents the face of the corresponding row in column 1010 in a different expression). For example, the expression modification system 124 receives an input image 1021 depicting a face with a neutral expression and generates an image 1022 depicting the same face with a happy expression. This is performed when the selected target expression is indicated by the user to be a happy expression. A different one of the output images in columns 1020 can be selected for output by the expression modification system 124 if the user selects a different target expression.

Figure 11:
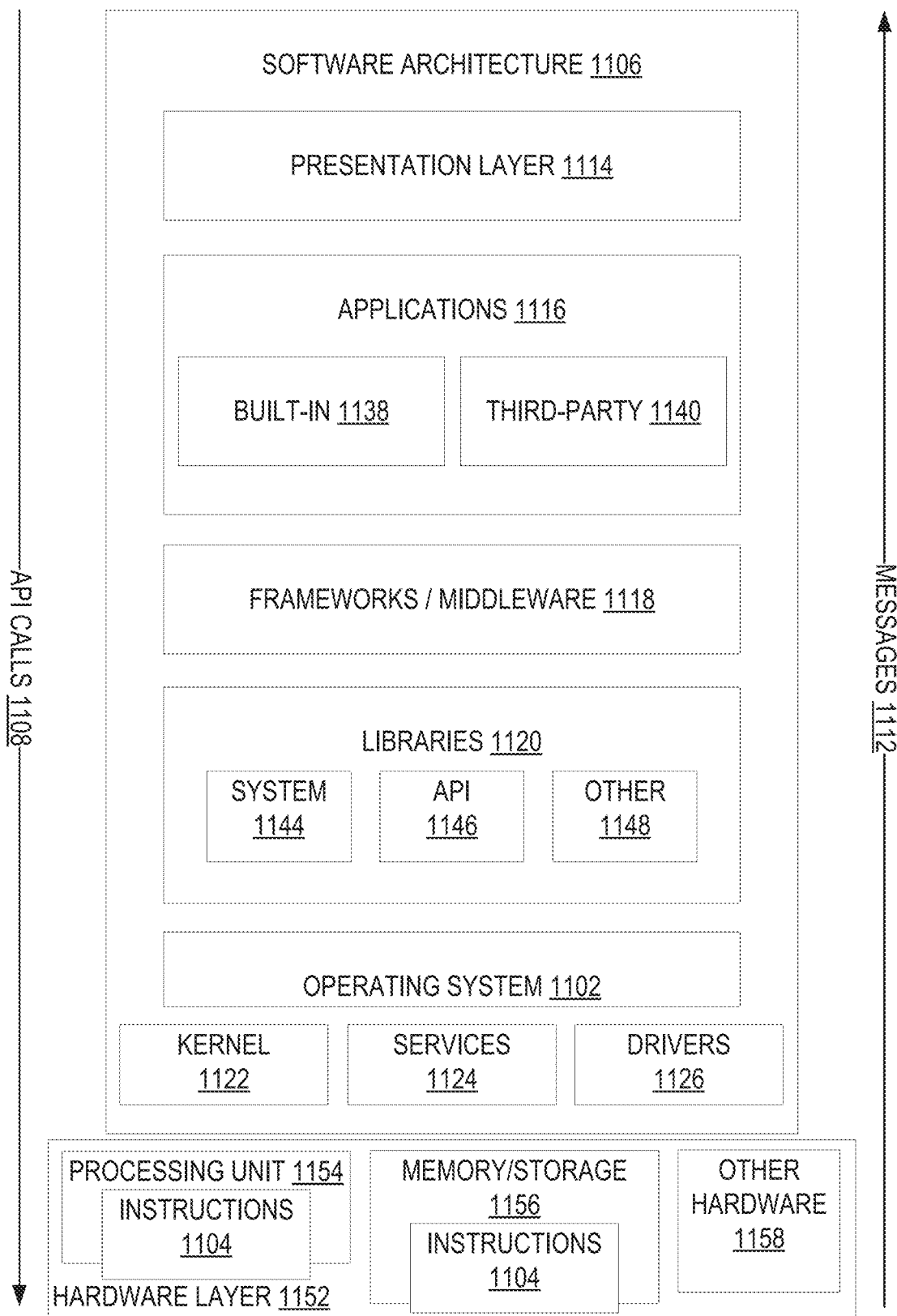
FIG. 11 is a block diagram illustrating a representative software architecture, which may be used in conjunction with various hardware architectures herein described, according to example embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as machine 1200 of FIG. 12 that includes, among other things, processors 1204, memory 1214, and input/output (I/O) components 1218. A representative hardware layer 1152 is illustrated and can represent, for example, the machine 1200 of FIG. 12. The representative hardware layer 1152 includes a processing unit 1154 having associated executable instructions 1104. Executable instructions 1104 represent the executable instructions of the software architecture 1106, including implementation of the methods, components, and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, frameworks/middleware 1118, applications 1116, and a presentation layer 1114. Operationally, the applications 1116 and/or other components within the layers may invoke API calls 1108 through the software stack and receive messages 1112 in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124, and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers). Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic UI (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built-in operating system functions (e.g., kernel 1122, services 1124, and/or drivers 1126), libraries 1120, and frameworks/middleware 1118 to create UIs to interact with users of the system. Alternatively, or additionally, in some systems, interactions with a user may occur through a presentation layer, such as presentation layer 1114. In these systems, the application/component "logic" can be separated from the aspects of the application/component that interact with a user.

Figure 12:
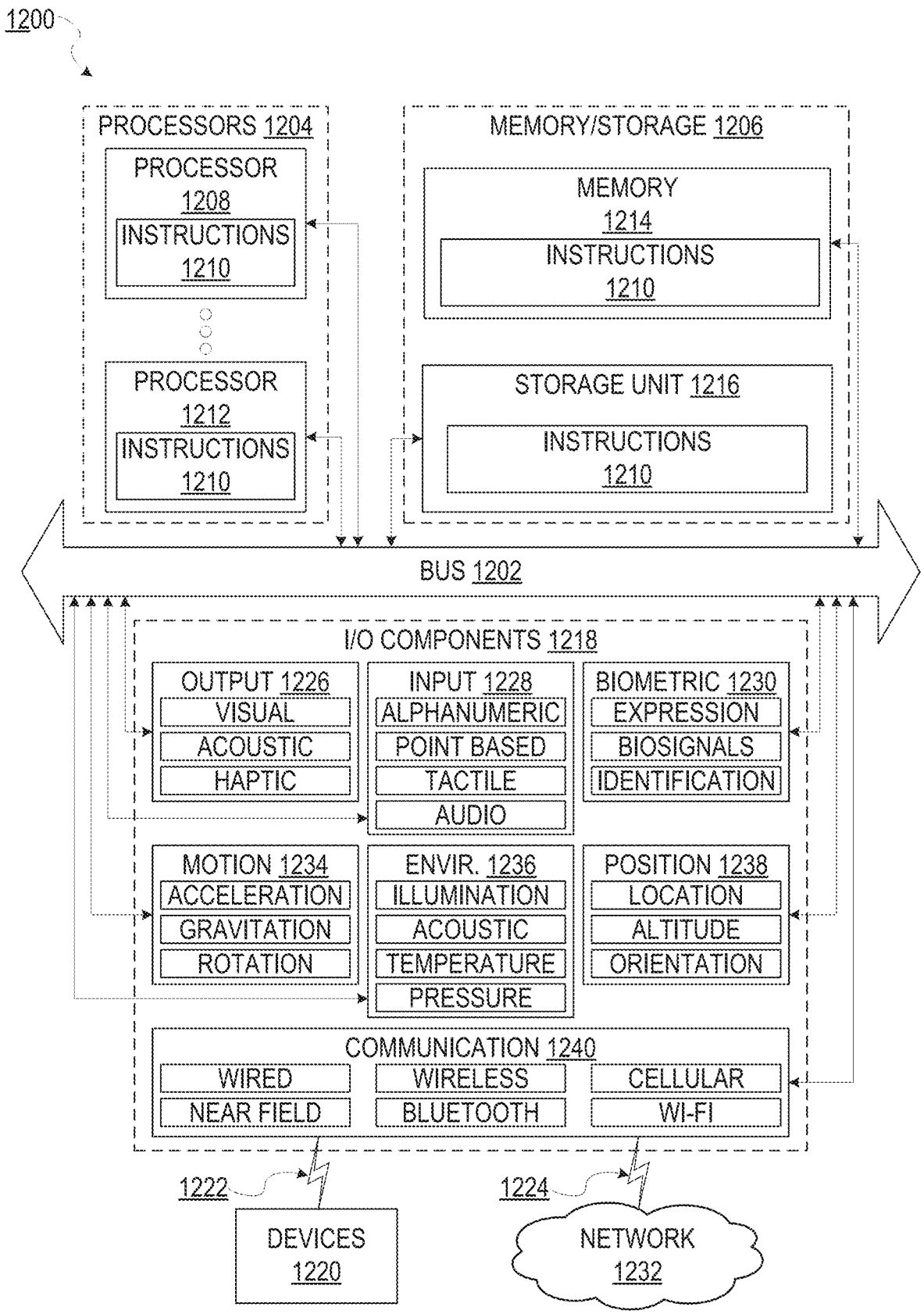
FIG. 12 is a block diagram illustrating components of a machine able to read instructions from a machine-readable medium (e.g., a machine-readable storage medium) and perform any one or more of the methodologies discussed herein, according to example embodiments.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory/storage 1206, and I/O components 1218, which may be configured to communicate with each other such as via a bus 1202. In an example embodiment, the processors 1204 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1208 and a processor 1212 that may execute the instructions 1210. The term "processor" is intended to include multi-core processors 1204 that may comprise two or more independent processors (sometimes referred to as "cores") that may execute instructions contemporaneously. Although FIG. 12 shows multiple processors 1204, the machine 1200 may include a single processor with a single core, a single processor with multiple cores (e.g., a multi-core processor), multiple processors with a single core, multiple processors with multiple cores, or any combination thereof.

The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environmental components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1224 and coupling 1222, respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy). Wi-Fi® components, and other communication components to provide communication via other modalities. The devices 1220 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components. NFC smart tag detection components, optical reader components (e.g., an optical sensor to detect one-dimensional bar codes such as Universal Product Code (UPC) bar code, multi-dimensional bar codes such as Quick Response (QR) code, Aztec code. Data Matrix. Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT). Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points. APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein. "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
    receiving, by one or more processors, an input image comprising a face having a first expression;
    obtaining, by the one or more processors, a target expression for the face, extracting, by the one or more processors, a texture of the face and a shape of the face;
    generating, by the one or more processors based on the extracted texture of the face, a target texture corresponding to the obtained target expression using a first machine learning technique;
    generating, by the one or more processors based on the extracted shape of the face, a target shape corresponding to the obtained target expression using a second machine learning technique, wherein coefficients of the first and second machine learning techniques are fixed while a third machine learning technique is trained; and
    combining, by the one or more processors based on an output of the third machine learning technique, the generated target texture output of the first machine learning technique and generated target shape output of the second machine learning technique into an output image comprising the face having a second expression corresponding to the obtained target expression, wherein the output image comprising the face having the second expression corresponding to the obtained target expression is generated for display in a user interface.

2. The method of claim 1, wherein obtaining the target expression for the face comprises receiving, from a client device, a selection of the target expression from a plurality of target expressions, wherein the first machine learning technique is trained to establish a relationship between texture features of training images depicting faces having different expressions and the target expression, and wherein the second machine learning technique is trained to establish a relationship between shape features of the training images depicting faces having the different expressions and the target expression.

3. The method of claim 1, wherein the input image is a two-dimensional (2D) image; and
    wherein extracting the texture and the shape of the face comprises:
    generating a three-dimensional (3D) model of the face from the 2D image; and
    extracting the texture and the shape of the face from the generated 3D model.

4. The method of claim 1, wherein the first machine learning technique comprises a conditional generative adversarial network (cGAN), wherein the second machine learning technique comprises a fully connected neural network, and further comprising training the first and second machine learning techniques using a plurality of different target expressions.

5. The method of claim 1, further comprising:
    generating a plurality of rendered faces having different target expressions for a plurality of training images using outputs of the first and second machine learning techniques.

6. The method of claim 5, further comprising:
    obtaining a plurality of expression coefficient vectors based on the target expression for the face;
    applying the plurality of expression coefficient vectors as conditions to be concatenated with the extracted texture, wherein the plurality of expression coefficient vectors corresponds to a set of geometric textures including object space normal, deformation, curvature, position difference, normal difference, and semantic labels.

7. The method of claim 5, wherein combining the generated target texture and generated target shape comprises applying the third machine learning technique to the input image, the generated target texture, and the generated target shape, wherein the third machine learning technique is trained, after the first and second machine learning techniques are trained, to establish a relationship between backgrounds of a plurality of training images and a corresponding one of the plurality of rendered faces.

8. The method of claim 7, further comprising:
    generating a set of training meshes generated from respective training images each comprising a background and a face having a given expression;
    training, using a plurality of different target expressions, the first machine learning technique to establish a relationship between texture features of each of the set of training meshes and a selected one of the different target expressions;
    training, using a plurality of different target expressions, the second machine learning technique to establish a relationship between shape features of each of the set of training meshes and the selected one of the different target expressions;
    generating a plurality of rendered faces having the different target expressions for each of the training images using outputs of the first and second machine learning techniques; and
    after the first and second machine learning techniques are trained, for each different target expression, training the third machine learning technique to establish a relationship between the background of each training image and a corresponding one of the plurality of rendered faces.

9. The method of claim 7, wherein applying the third machine learning technique comprises:
    combining the generated target texture and the generated target shape into a rendered face; and
    applying the rendered face to the input image to identify a region outside of the face in the input comprising a background image.

10. The method of claim 9, wherein the third machine learning technique generates the output image based on the input image, the rendered face and the background image.

11. The method of claim 7, wherein the third machine learning technique generates the output image further comprising blending the output image with the input image.

12. The method of claim 1, wherein generating the target shape corresponding to the obtained target expression using the second machine learning technique comprises:
   obtaining identity and source expression coefficients as the extracted shape;
   obtaining target expression coefficients based on the target expression; and
   applying the second machine learning technique to identity, source, and target expression coefficients.

13. The method of claim 1, wherein generating the target shape comprises generating displacement vectors for all vertices on the shape of the face, wherein the first expression comprises a neutral expression and the second expression comprises a happy or sad expression, wherein the output image represents a modification of the face having the neutral expression to the face having the happy or sad expression.

14. The method of claim 13, further comprising reducing a number of the displacement vectors by computing vertex displacement as a function of a generic three-dimensional (3D) face shape.

15. The method of claim 1, wherein the first and second machine learning techniques are trained using a first plurality of images having a plurality of different expressions and depth information and a second plurality of images having the plurality of different expressions without depth information.

16. The method of claim 1, further comprising receiving user input comprising an instruction to modify the first expression in the input image to the second expression, wherein the texture of the face represents visual properties of respective facial landmarks; and
   wherein the shape of the face represents a visual layout comprising physical location of the facial landmarks.

17. A system comprising:
   a processor configured to perform operations comprising:
   receiving an input image comprising a face having a first expression;
   obtaining a target expression for the face;
   extracting a texture of the face and a shape of the face;
   generating, based on the extracted texture of the face, a target texture corresponding to the obtained target expression using a first machine learning technique;
   generating, based on the extracted shape of the face, a target shape corresponding to the obtained target expression using a second machine learning technique, wherein coefficients of the first and second machine learning techniques are fixed while a third machine learning technique is trained; and
   combining, based on an output of the third machine learning technique, the generated target texture output of the first machine learning technique and generated target shape output of the second machine learning technique into an output image comprising the face having a second expression corresponding to the obtained target expression, wherein the output image comprising the face having the second expression corresponding to the obtained target expression is generated for display in a user interface.

18. The system of claim 17, further comprising receiving user input comprising an instruction to generate a new image from the input image in which the first expression is changed to the second expression.

19. A non-transitory machine-readable storage medium that includes instructions that, when executed by one or more processors of a machine, cause the machine to perform operations comprising:
   receiving an input image comprising a face having a first expression;
   obtaining a target expression for the face;
   extracting a texture of the face and a shape of the face;
   generating, based on the extracted texture of the face, a target texture corresponding to the obtained target expression using a first machine learning technique;
   generating, based on the extracted shape of the face, a target shape corresponding to the obtained target expression using a second machine learning technique, wherein coefficients of the first and second machine learning techniques are fixed while a third machine learning technique is trained; and
   combining, based on an output of the third machine learning technique, the generated target texture output of the first machine learning technique and generated target shape output of the second machine learning technique into an output image comprising the face having a second expression corresponding to the obtained target expression, wherein the output image comprising the face having the second expression corresponding to the obtained target expression is generated for display in a user interface.

20. The non-transitory machine-readable storage medium of claim 19, further comprising operations for receiving user input comprising an instruction to generate a new image from the input image in which the first expression is changed to the second expression.

* * * * *

UNITED STATES PATENT AND TRADEMARK OFFICE
CERTIFICATE OF CORRECTION

PATENT NO. : 11,055,514 B1  
APPLICATION NO. : 16/220859  
DATED : July 6, 2021  
INVENTOR(S) : Cao et al.

Page 1 of 1

It is certified that error appears in the above-identified patent and that said Letters Patent is hereby corrected as shown below:

In the Claims

In Column 25, Line 28, in Claim 1, delete "face," and insert --face;-- followed by a linebreak therefor Signed and Sealed this
Seventh Day of December, 2021

Drew Hirshfeld
*Performing the Functions and Duties of the
Under Secretary of Commerce for Intellectual Property and
Director of the United States Patent and Trademark Office*